(12) United States Patent
Ryder

(10) Patent No.: US 7,249,168 B1
(45) Date of Patent: Jul. 24, 2007

(54) METHOD AND APPARATUS FOR AUTOMATED REMOTE VOLUME MOUNTING USING A PLUG-IN INSTALLED ON A CLIENT

(75) Inventor: Scott Ryder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1090 days.

(21) Appl. No.: 09/751,903

(22) Filed: Dec. 28, 2000

(51) Int. Cl.
*G06F 15/177* (2006.01)
*G06F 15/16* (2006.01)

(52) U.S. Cl. ............. 709/220; 709/217; 709/229
(58) Field of Classification Search ........... 709/217, 709/219, 216, 220, 250, 245, 229; 713/201
See application file for complete search history.

(56) References Cited

U.S. PATENT DOCUMENTS

| | | | | |
|---|---|---|---|---|
| 5,673,382 A | * | 9/1997 | Cannon et al. ............. 714/6 |
| 6,119,131 A | * | 9/2000 | Cabrera et al. ............. 707/203 |
| 6,212,640 B1 | * | 4/2001 | Abdelnur et al. ........... 713/201 |
| 6,370,545 B1 | * | 4/2002 | Shaath ....................... 707/200 |
| 6,493,729 B2 | * | 12/2002 | Gusler et al. ............... 707/204 |
| 6,525,894 B1 | * | 2/2003 | Nakamura ................... 360/49 |
| 6,553,415 B1 | * | 4/2003 | Manwiller .................. 709/222 |
| 6,606,651 B1 | * | 8/2003 | Linde ......................... 709/216 |
| 6,615,276 B1 | * | 9/2003 | Mastrianni et al. ......... 709/220 |
| 6,708,265 B1 | * | 3/2004 | Black ......................... 711/207 |
| 2001/0039553 A1 | * | 11/2001 | LaMarca et al. .......... 707/501.1 |
| 2001/0047400 A1 | * | 11/2001 | Coates et al. ............... 709/219 |
| 2001/0049675 A1 | * | 12/2001 | Mandler et al. ............. 707/1 |

* cited by examiner

*Primary Examiner*—Paul H. Kang
(74) *Attorney, Agent, or Firm*—Adeli Law Group

(57) ABSTRACT

A method and apparatus for remotely and automatically mounting volumes over a network. The invention uses an interface, such as a web browser, to authenticate a client on a server. The server supplies volume mounting parameters specific to the authenticated client via a plug-in installed on the client. The plug-in then interacts, in one embodiment of the invention, with file system software on the client and automatically mounts the volume(s) in accordance with the supplied parameters.

20 Claims, 7 Drawing Sheets

PROFILE DATASTORE 300

| login ID | password | Volume Name | Server Alias | Username | Password |
|---|---|---|---|---|---|
| john | yyyyy | Volume A | doghouse | jgray | xxxxxx |
| | | Volume C | wolfhound | johngray | zzzzz |
| jack | 111111 | Volume A | doghouse | jack | 111111 |

FIG. 3

METHOD AND APPARATUS FOR AUTOMATED REMOTE VOLUME MOUNTING USING A PLUG-IN INSTALLED ON A CLIENT

BACKGROUND

1. Field of the Invention

The present invention relates to software for computer systems and networking. More specifically, the present invention relates to the accessibility of remote storage devices.

2. Description of Related Art

Disk drives, logical or physical partitions of disk drives and even file servers are all often referred to loosely as "volumes". Computer operating systems typically have commands and procedures for "mounting" disk drives (such as floppy drives, hard drives and CD (Compact Disc) drives) to make them available to the user. On a local machine such mounting can be done once during the installation of the drive and thereafter will be accessible upon any system startup instance. Drives may also be "hot-swapped" so that they are recognized by the operating system and made available to the user instantly upon interfacing with the computer's hardware.

Over a local area network (LAN), client machines can connect to volumes hosted by servers over the LAN depending on their authentication and permissions. To connect or mount such networked volumes, one common requirement is that the client be authenticated by the server. Once so authenticated, the user must search or browse for hosted volumes, and then connect to the desired volumes often using yet another authentication procedure. For instance, on Appleshare(™), a product of Apple Computers, Inc., the client user browses the network and finds first the desired server. Then, the user clicks on the server icon and is usually required (where guest access is not enabled on the server) to again enter a username and password. Once authenticated, the user must browse and select from available volume(s). Thereafter, the selected volume(s) is(are) available on the operating system desktop of the client machine appearing as any local drive would.

One issue with typical volume mounting is the time expended. Another is that of repeating the same process the next time the same volume needs to be mounted. Any of the parameters, such as a network location, name or alias, that uniquely identify a given volume may have changed or may not be remembered by the user and must be found again. Also, there are often additional steps needed for clients that remotely "dial-in" to a given network, and then attempt to locate network resources.

There is thus a need for automating the volume mounting process.

SUMMARY OF THE INVENTION

The invention is a method and apparatus for remotely and automatically mounting volumes over a network. The invention makes use of an interface, such as a web browser, to connect a client to a server. Volume mounting parameters are retrieved from generic or specific profiles that are accessed in accordance with a request from the client to the server. The server supplies volume mounting parameters specific to the client via a plug-in installed on the client. The plug-in then interacts, in one or more embodiments of the invention, with an application programming interface and/or system software on the client which automatically mounts the volume(s) in accordance with the supplied parameters.

In at least one embodiment of the invention, the server assembles a mounting command block consisting of retrieved volume mounting parameters and a mount command. Additionally, in some embodiments, the plug-in must first verify as approved the server returning the mounting command block in order for volume mounting to proceed.

BRIEF DESCRIPTION OF THE DRAWINGS

FIG. 3 illustrates a sample set of user mounting profiles that may be retrieved from a server according to the invention.

DETAILED DESCRIPTION OF THE INVENTION

Figure 1:
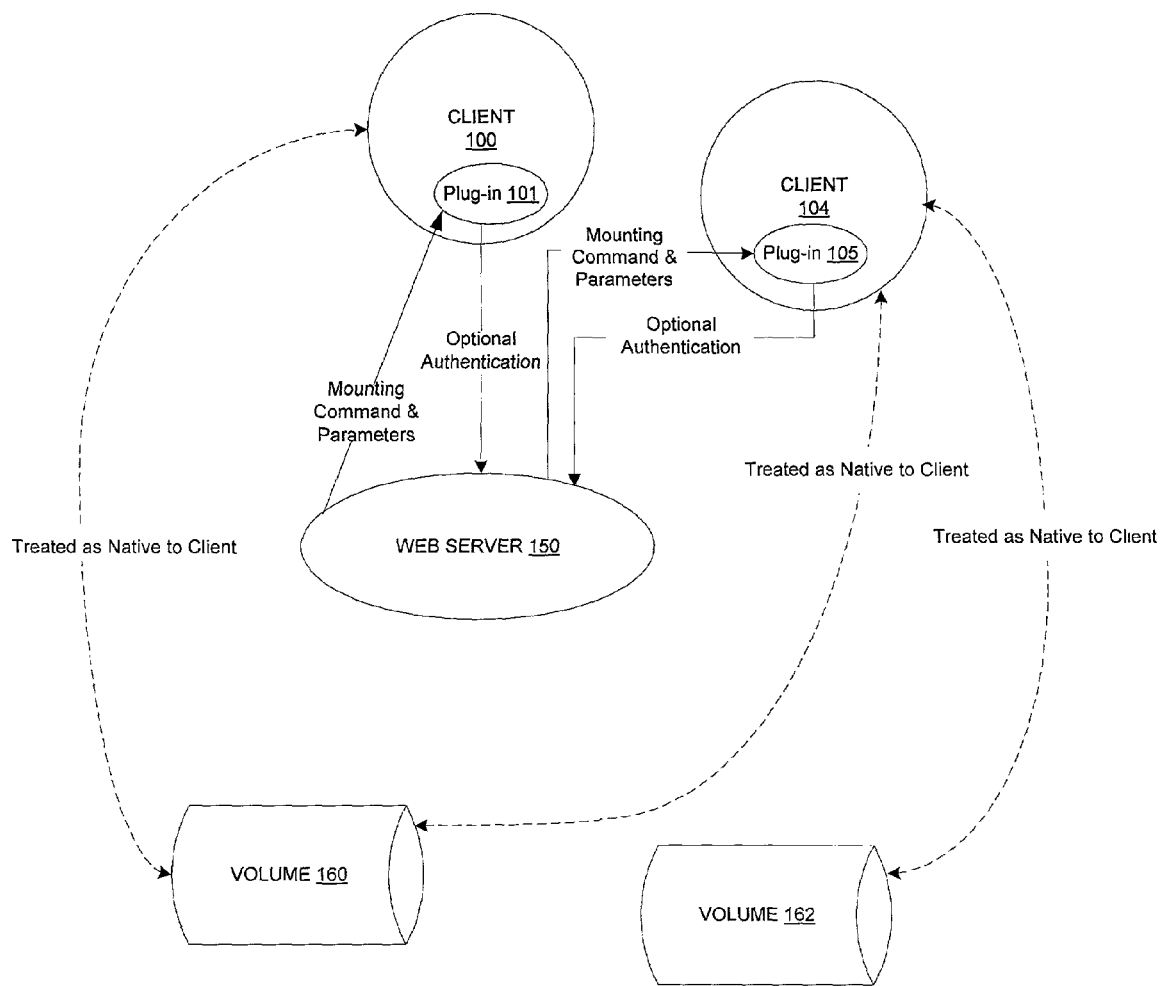
FIG. 1 illustrates remote automated volume mounting according to at least one embodiment of the invention.

FIG. 1 illustrates remote automated volume mounting according to at least one embodiment of the invention. Volume mounting is commenced, according to the invention, by a client logging into a control web server and, optionally, sending authentication information (such as a login identification and password) to the web server. FIG. 1 shows two such clients, client 100 and client 104 capable of communicating with a web server 150. Each client 100 and 104 has plug-in modules 101 and 105, respectively, installed on their systems which communicate with web server 150. In one embodiment, to maintain security, the optional authentication information is accepted by the web server 150 only when a cookie is detected on the client. The existence of the cookie indicates that the appropriate plug-in module has been installed on the client.

A user of client 100 who wants to have volumes mounted from a remote location may send authentication information to web server 150. Alternatively, some process or event occurring on client 100 may require/request to have one or more remote volumes mounted as part of its operation. Web server 150 maintains or has access to a profile of client 100 regarding what file volumes should be automatically mounted, which volumes, if any, should be selectively mounted and the client's authentication information. If there is authentication information from the client 100, web server 150 compares the authentication information provided by client 100 with the profile maintained for the client 100. If the authentication is approved, web server 150 sends the plug-in 101 of client 100 mounting command & parameters such as which volumes to mount to, and username and password information specific to those volumes. For instance, in the case of client 100, web server 150 would send information in order to mount a volume 160, such as the file server alias, volume name(s), location/designation and access codes (such as logins and passwords), if any, that would be required.

Plug-in 101 performs a number of functions prior to the automatic mount specified in the mounting command & parameters. The plug-in 101 obtains the address (such as IP (Internet Protocol) address) of the web server 150. Then, the plug-in 101 checks to see if the address of web server 150 is included in a list of approved servers. The list of approved servers is embedded in the plug-in 101 or encrypted/scrambled such that only plug-in 101 may access. If the web server 150's address is not valid (i.e. does not appear in the list of approved servers), the plug-in 101 terminates its operation and no mounting occurs. This serves as an additional level of security in addition to the optional user authentication. With the approved server address mechanism, the plug-in 101 can be better assured that the potential volume mount is authorized, with or without user authentication.

If the web server 150's address is valid, then file system software built on the operating system of client 100 receives the mounting command & parameters and automatically mounts the specified volume (volume 160) without the need for user intervention. After volume 160 is mounted successfully, it will thereafter behave as if it were a native file volume (e.g. hard disk connected directly to client bus) of client 100. For instance, the icon pertaining to volume 160 may be displayed of the desktop or other location where the list of all other disks and volumes of client 100 are displayed.

Like client 100, client 104 is also equipped with an appropriate plug-in module 105. When client 104 accesses the website of server 150, then server 150 may accept optional user authentication information from client 104. If the profile corresponding to the login ID supplied by client 104 indicates a need to connect automatically with volumes 160 and 162, the mount command & parameters for both of these volumes is sent in turn to the operating system of client 104 via plug-in 105. The client 104 then proceeds to mount both volumes 160 and 162 without any further intervention by users of client 104. Plug-in 105 also checks to see if the web server 150 is on its list of approved servers prior to accepting the mount command & parameters from web server 150. The list of approved servers in each of the plug-ins 101 and 105 may be different, but are shown in FIG. 1 to both include, at least, the address of web server 150.

As demonstrated in FIG. 1, the invention provides for a single easily accessible point of entry, e.g. web server 150, to mount volumes that are to be shared among clients. Volumes 160 and 162 appear to client 104 as would native volumes of client 104.

Though not specifically depicted in FIG. 1 it can be assumed that web server 150, client 100, client 104, volume 150 and volume 160 could be connected together through some global network such as the Internet, WAN (wide area network) or LAN (local area network). In accordance with the invention, the network configuration is not a consideration in mounting of the file volume. However, if an IP (Internet Protocol) address is required to connect to a given volume, then that address can be obtained by resolving a supplied server alias to an IP address. IP address, host name and other designation of network location (such as local area network routing path) may transmitted along with volume mounting parameters or may be resolved by translating aliases in a table. A successful mounting of the volume(s) implies that the client is enabled with the appropriate transport/network mechanisms necessary for direct transfer of data with those volumes.

Further, while not illustrated in FIG. 1, the web server 150 may be connected to a number of other servers or have processes/applications running upon it that perform functions such as database management.

Figure 2:
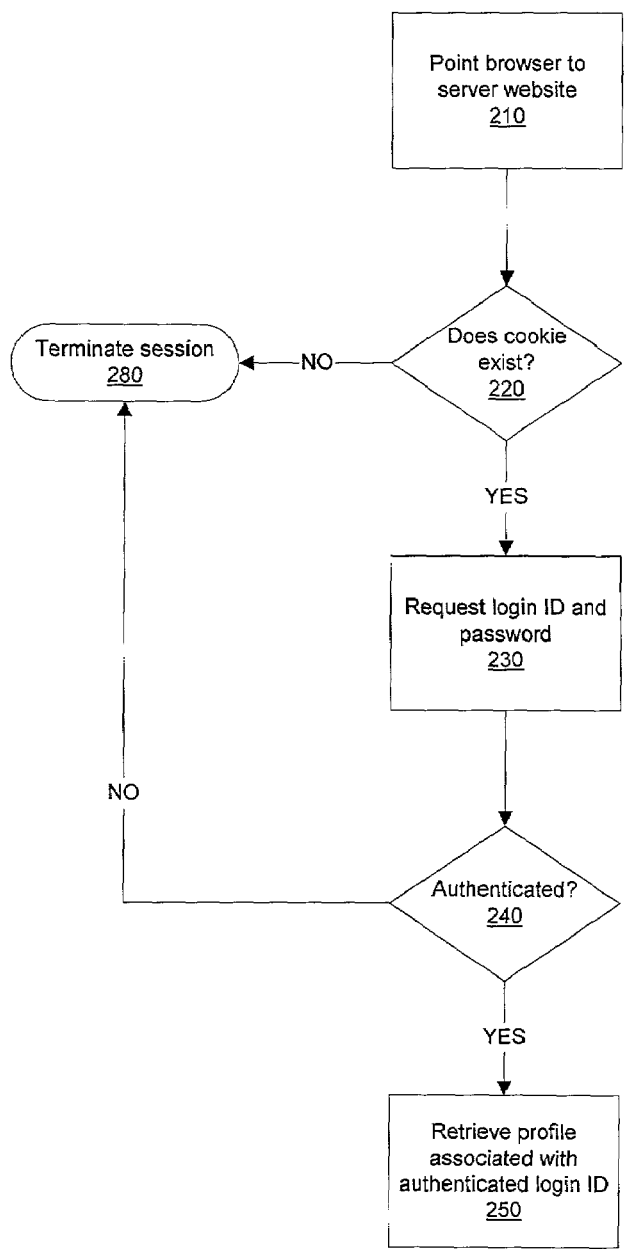
FIG. 2 is a flowchart of retrieving a user mounting profile according to at least one embodiment of the invention.

FIG. 2 is a flowchart of retrieving a user mounting profile according to at least one embodiment of the invention. First, the user of the client machine should point the browser or other web interface application to the web server website (block 210). The web server website address can be provided during plug-in installation via an automatic addition to the browser's bookmark listing (such as the 'Favorites' list found on some browsers), or by placing a shortcut/menu item on the client's desktop. When the server website is contacted to, it checks for the existence of a particular cookie on the client machine (block 220). A cookie is a persistent information store (file/object) stored on a client that can be accessed by websites the client connects to. The cookie being checked for exists only if the plug-in has be installed or is part of the system.

If the cookie does not exist, then the session is terminated (block 280) in order to preserve security. If the cookie exists (i.e. the plug-in is installed in the client), then the login process is commenced. The server website then requests a login ID and password or similar authentication from the client (block 230). In response to the client sending the server authentication information, the server checks if the authentication is valid (block 240). If the authentication is not valid then the session is terminated (block 280). If the authentication is valid, then a profile associated with the authenticated login ID is retrieved (block 250). The profile indicates what volume(s) are to be mounted, what usernames and passwords (if any) are to be supplied for those volumes, and the network location or designation of the volumes (such as server alias, host name, IP address, routing path, etc.). Additionally, the profile may indicate folders within volumes where access is restricted or which folders are public/private. The retrieved profile may then be parsed, and its information supplied to the plug-in of the client (as part of the volume mounting command block, for example).

FIG. 3 illustrates a sample set of user mounting profiles that may be retrieved from a server according to the invention. A profile datastore is a set of profiles stored on the server that is used to regulate the remote automated volume mounting process. The profile datastore 300 of FIG. 3 depicts profiles for two separate login IDs-"john" and "jack". Profile datastore 300 may be a part of a database, portion thereof or a flat file stored on or made accessible to the volume mounting website server. Profile datastore 300 consists of variable length records, each record characterized primarily by a login ID field 313. The size/length of each record depends directly upon the number of volumes to be mounted for that login ID.

The authentication information (see FIGS. 1 and 2, and associated description above) which may be sent to the server by the client is compared against the authentication strings in the profile datastore 300. The authentication strings include login ID 313 and a password field 315. Where user authentication is transmitted, to gain access to the website server and volume mounting parameters, both the login ID and password must match the corresponding authentication strings. For example, the password "yyyyyy" must be transmitted along with the login ID "john" if login ID "john" is to be authenticated.

Assuming the server authenticates login ID "john", then volume mounting parameters contained the record indexed by login ID "john" is retrieved. The volume mounting parameters includes a number of fields, including, volume name 330, server alias 340, username 350 and password 360. The volume name field 330 is a designator used to easily identify the volume and may be descriptive in nature. Client operating environments may use the value of the volume name field 330 as the name of the volume once mounted. The value of the volume name field 330 can be used by the client in constructing a desktop icon for the mounted volume. The value of the server alias 340 is a string, which may be descriptive in nature, designating the server where the volume name specified in the corresponding volume name field 330 is physically a part of. A table can be provided which resolves server alias 340 to an actual Internet Protocol (IP) address where the server is located. For instance, the server alias "doghouse" may be resolved by a look-up table to the physical IP address "128.127.1.1".

Alternatively, depending on the network configuration through which volume mounting is being performed, the value of the server alias field 340 may be resolved/translated to a local area network designation or network routing path. For instance, where only intranet-based clients are permitted to mount volumes, then IP addresses may not be needed, or may not even be used.

The values of the volume name 330 and server alias 340 fields are passed to a client via the client's plug-in. The plug-in also receives values for a username 350 and password 360 associated with a particular volume. In the record indexed by login ID "john", that particular ID "john" has a username 350 of "jgray" and a password 360 of "xxxxxx". The plug-in takes the username "jgray" and associated password "xxxxxx" and automatically uses these as arguments when the command is issued to mount volume A. This eliminates the need for the user to manually enter/remember "jgray" and "xxxxxx" or the need to manually clear (by clicking, hitting a key) a dialog box that may store the correct username and password ("jgray" and "xxxxxx", respectively) for volume A. The volume mounting parameters for each volume includes a username field 350 and password field 360 separate from that of the login ID 313 and password 315 since these may differ. Similarly, volume name 330, server alias 340, username 350 and password 360 are all transmitted to the client plug-in after being retrieved from profile datastore 300. The volume mounting parameters for volume C may be transmitted following the mounting/attempted mounting of volume A, or may be transferred to the client and queued thereon. Depending upon the client's operating environment, it may be possible to mount both of the volumes A and C in a concurrent fashion.

With the use of profile datastore 300, the volume mounting preferences (information) pertaining to multiple users may all be centralized in one location. For instance, a second user, having a website login ID of "jack" can also mount volume A automatically upon entering in the proper password "111111" associated therewith. In this example, the username 350 and password 360 ("jack" and "111111" respectively) are the same as the website login ID 313 and password 315 (again, "jack" and "111111" respectively. In other embodiments, a given login ID may also be able to manually select a list of volumes that can be mounted.

Such a profile datastore 300 may also store, in addition to specific user profiles, one or more generic profiles that correspond to certain client processes or events that require a mounting of volumes. Such generic profiles may be retrieved from datastore 300 without a validated user authentication. Generic profiles may be useful where public or global access to certain volumes needs to be granted.

Figure 4:
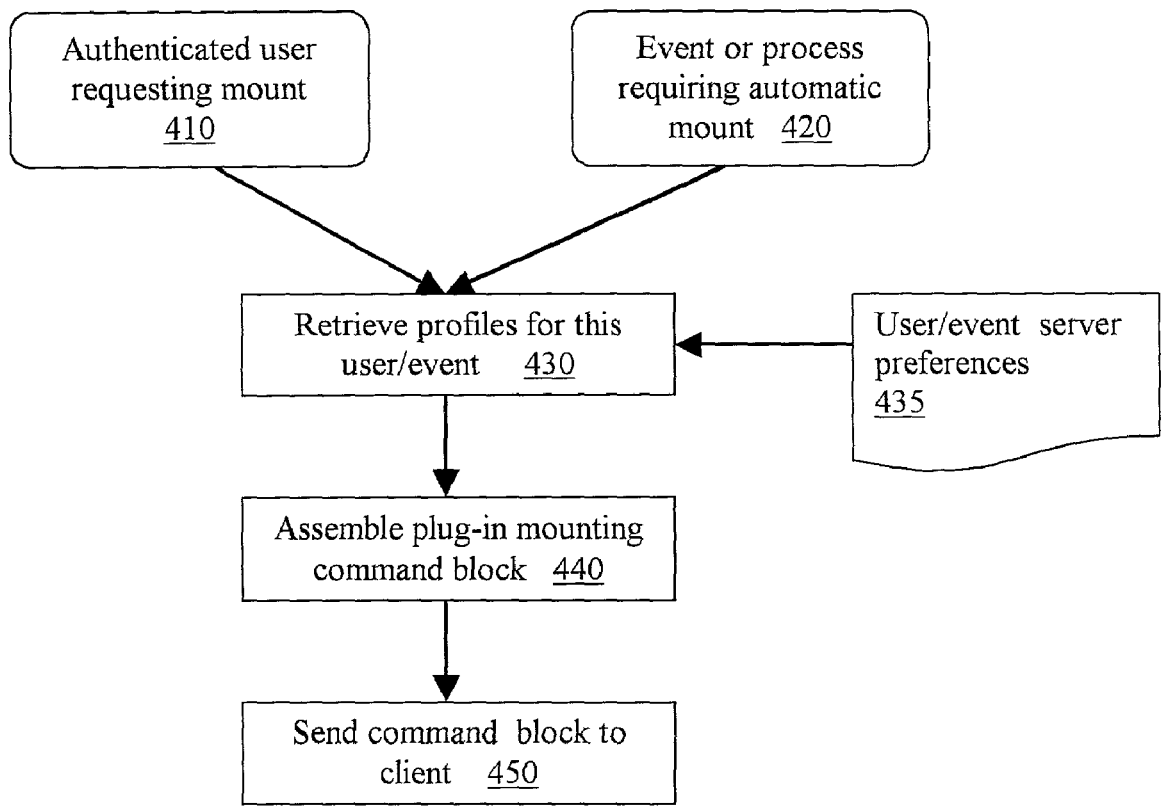
FIG. 4 is a flowchart of client-server interaction according to at least one embodiment of the invention.

FIG. 4 is a flowchart of client-server interaction according to at least one embodiment of the invention. A client can request a web server for a volume mount either as the result of a successful user authentication (block 410) or a situation, event or process occurring on the client that requires a volume mount (block 420). For instance, where a process such as file uploading requires that a certain volume be available to transfer data, the request for mount could be automatically placed, without user authentication, to the server. The mount request is not necessarily explicit but a logical means of describing the initiation of the automated mounting process. As a result of either blocks 410 or 420, profiles for the user/event are retrieved by the server (block 430). As mentioned above, the profiles may reside in one or more datastores accessible by the server, and contain volume mounting information indexed by user. Additionally, a subset of such profiles may also be marked or indexed as generic and associated with a process/event rather a particular user. The profile(s) that are retrieved as a result of block 430 supply mounting preferences 435 for the process to continue. Mounting preferences 435 include items such as volume name(s), username(s), password(s) and server alias (es). Using the preferences 435 as input, the server assembles a "mounting command block" (block 440) for the plug-in on the client.

The mounting command block includes volume mounting parameters parsed from the preferences 435 and a mounting command set. A mounting command block may be assembled as part of an XML (Extensible Markup Language) or similar document and may be represented in the form of tags. The mounting command block, either separately, or as part of an XML document, is then sent to the client (block 450). The client receives the command block via the plug-in that was previously installed or embedded thereon.

Figure 5:
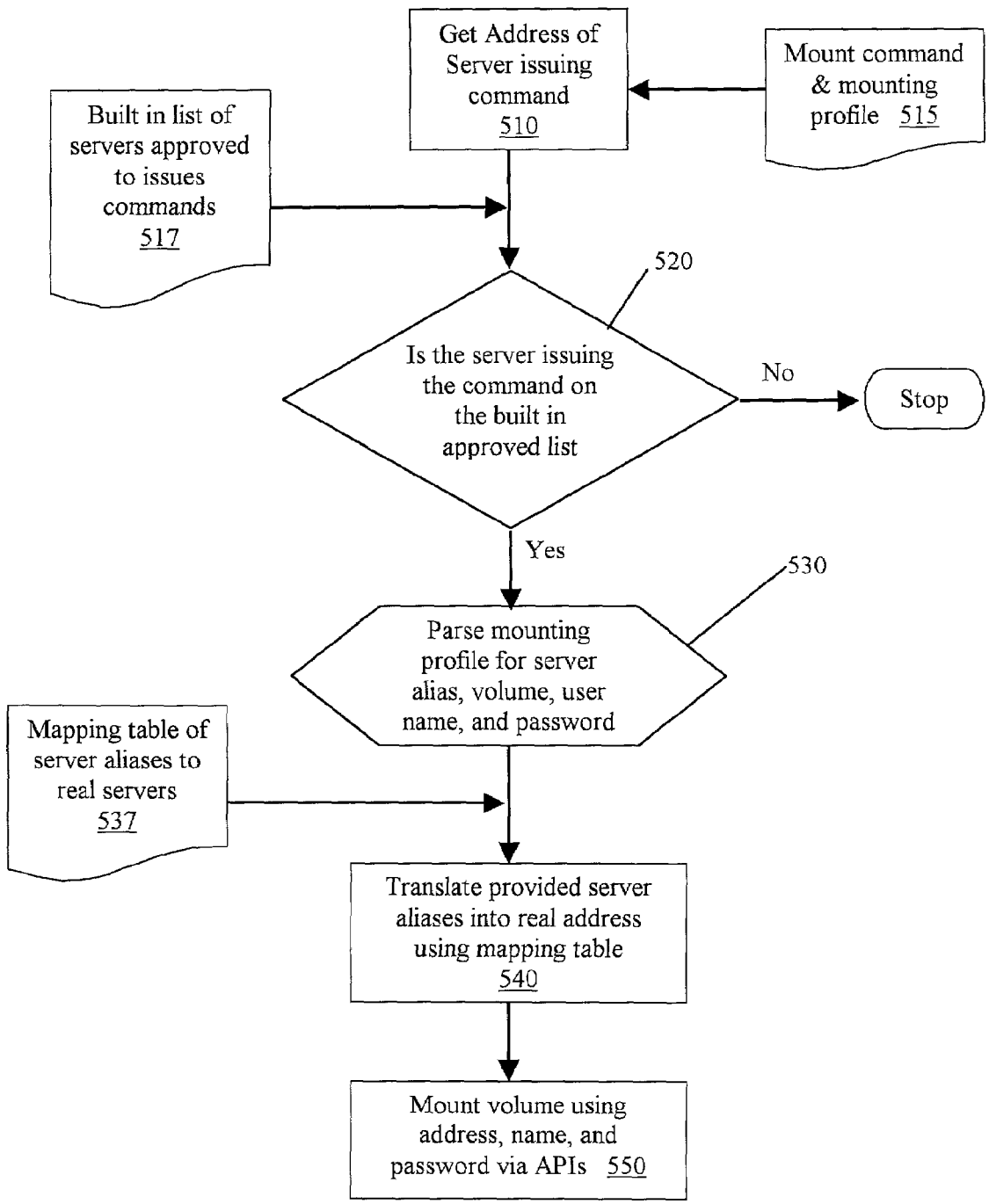
FIG. 5 illustrates the operation of the plug-in in accordance with one or more embodiments of the invention.

FIG. 5 illustrates the operation of the plug-in in accordance with one or more embodiments of the invention. After the mounting command block is issued by a server, the plug-in on the client obtains the address of that server (block 510). The mounting command block, which consists of mounting profile and the mount command, is passed as an input to the plug-in (block 515). The plug-in accesses a list of servers approved to issue such mounting commands that may be embedded within it (block 517). The plug-in checks whether the address of the server that issued the mounting command block is on the built-in list of approved servers (block 520). If it is not, then the process terminates and no further action is taken by the plug-in.

If the server that issued the mounting command is on the built-in approved server list, then the mounting process can continue. The plug-in next parses the mounting profile of the mounting command block for the volume mounting parameters, including the server alias (of where the volume resides), the volume name, and any associated username and password (block 530). The plug-in then utilizes a mapping table (block 535) that translates/resolves server aliases into real, physical addresses such as IP addresses. Using this mapping table, the plug-in translates the parsed server alias to the physical server address (block 540). Through available APIs (Application Programming Interfaces), the plug-in then initiates the mount of the volume specified in the mounting command block that has been parsed (block 550). Examples of such APIs include AFP (Apple Filing Protocol), which works over IP, and CIFS/SMB (Common Internet File System/System Messaging Block) which is found in Microsoft Windows-based machines.

Figure 6:
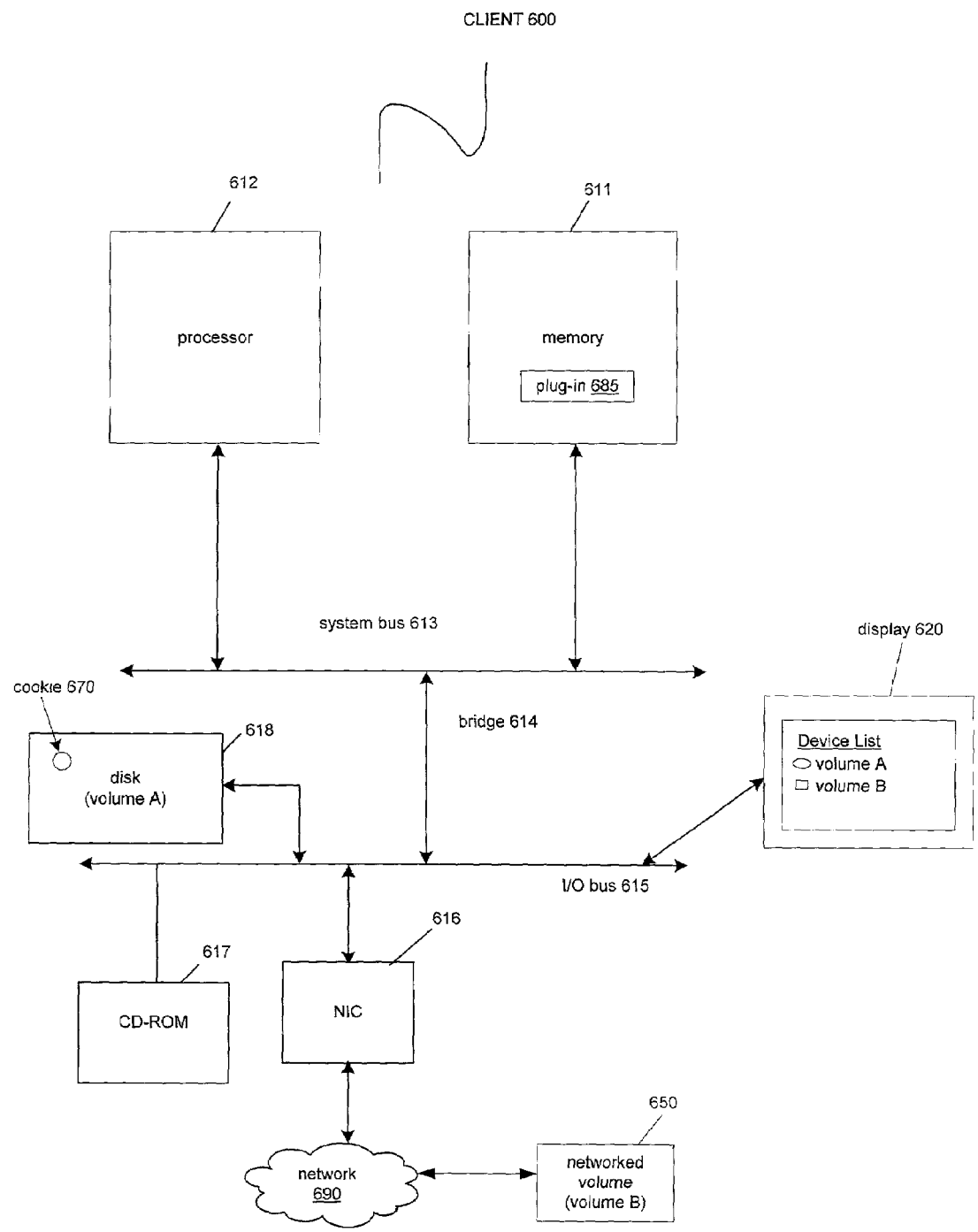
FIG. 6 shows an exemplary computer system acting as a client in accordance with the present invention.

FIG. 6 shows an exemplary computer system acting as a client in accordance with the present invention. A client computer system 600 may be a mobile computer, desktop computer or any general or special purpose information processing device. The client system 600 features a system bus 613 for allowing components, such as a processor 612 and memory 611, to communicate with each other. Memory 611 consists of random access memory (RAM) or other volatile storage mechanism and operates to store instructions to be executed by processor 612 and data. Memory 611 also may be used for storing temporary variables or other intermediate result data during execution of instructions by processor 612.

Client system 600 also has a bridge 614 which couples to an I/O (Input/Output) bus 615. I/O bus 615 connects to system 600 various peripheral and I/O devices such as a network interface card (NIC) 616, a disk 618 and a CD-ROM (Compact Disc-Read Only Memory) 617. I/O bus 615 also couples to the system a display device 620 such as a monitor or LCD (Liquid Crystal Display). The NIC 616 enables the client 600 to connect to one or more networks 690 such as the Internet or a LAN (Local Area Network) and facilitates the exchange of information between client 600 and other devices/systems on that network 690. Disk 618 is a hard disk drive, floppy disk drive or tape drive or other form of non-volatile storage and is used to store data/application files and other more permanent information.

Client 600 has an operating system software (not depicted) that handles the interaction between its components and other applications. The mounting of disks and the initialization of devices are typical responsibilities of operating system software. Operating system software also governs the manner/mechanism of input/output for users of client 600. Applications, such as a web browser or web interface, are usually built on top of and work in conjunction with the operating system software. Due to its criticality, operating system software is most often permanently stored on disk 618, firmware or other semi-permanent storage. Operating system software may also include extensions, available in APIs, that perform specified tasks such as mounting of a volume over IP (such as Apple Filing Protocol). File system software (such as Apple Computer's Appleshare(™)) is typically considered a part of the operating system but may also be a separate component software built on top of the operating system software. Such file system software may also be accessed in addition to or instead of APIs as part of the automated mounting process.

In accordance with one embodiment of the invention, client 600 commences remote automated volume mounting by opening a web browser or web interface to the server website which is accessible over network 690. A connection to the server website is made by establishing an HTTP (Hypertext Transport Protocol) session with the website through the NIC 616. Once established, the website checks for the existence of a cookie on the client indicating that the appropriate plug-in has been installed. Client 600 contains one such cookie 670, stored on disk 618, whose existence signals that the plug-in module has been installed. The plug-in module is dedicated piece of software that can be loaded into memory 612 and passes information to an API/file system software to mount volumes. Once the cookie 670 has been detected by the server, the server requests (via HTTP, secure HTTP or similar mechanism) the client 600 for a login ID and password. In response, a user of client 600 may enter a login ID and password through some input device such as a keyboard (not depicted) or by simply indicating acceptance of a login ID and password stored on client 600. If the login ID and password is authenticated by the server, the client 600 receives therefrom volume mounting command block including volume mounting parameters.

In other embodiments, the server website may be accessed by the operation of some event or situation, instead of strictly as a function of a manual HTTP session. In such embodiments, such user authentication may be completely bypassed. For instance, where a public file volume is to be downloaded from, it may necessary to mount that volume without any user authentication. In this case, generic mounting parameters could be returned to the client 600.

A plug-in 685 may be loaded into memory 611 as a part of the operation of web browser software as the result of the event/situation requiring a volume mount. The plug-in 685 consists of one or more portions of computer program code that load into memory 611 through an application such as a web browser or as the result of some system event. Whether the mounting request is initiated by user authentication or some event or situation, a plug-in 685 first checks to see if the mounting command block was issued by a server that is on the plug-in 685's built-in list of approved servers. If so, the plug-in 685 parses the volume mounting parameters (see FIG. 5), resolving server aliases if appropriate, and then passes it to an API or file system software which is either a part of or built on top of the operating system software. In the example of FIG. 6, a successful authentication or some other event by the server will cause the plug-in 685 of client 600 to receive mounting parameters regarding networked volume 650. Networked volume 650 is a file system, disk or portion thereof that has been connected to network 690. One parameter pertaining to networked volume 650 is a designation of its volume name as "volume B". The volume name parameter, along with a username and password for the volume corresponding to the authenticated login ID is passed to the API/file system software through the plug-in 685. For the API/file system software of client 600 to mount networked volume 650, the physical location of the server must be made known. The plug-in 685, in one embodiment, will resolve a server alias, supplied as part of the volume mounting parameters, to a physical location such as IP address or network location. In this instance, the server alias will be resolved to the IP address/network path of networked volume 650.

The file system software connects to networked volume 650 (using the resolved location designation of the server housing the volume to be mounted) and then automatically supplies the username and password through the file system software. The networked volume 650 uses the supplied username and password to log client 600 in. Once logged, the operating system software is signaled and uses the volume name "volume B" and places an icon for volume B onto the list of available devices 680. The icon and name for networked volume 650 appear on display 620 as part of the device list 680. Device list 680 enumerates volumes which are either native or appear native through automated mounting process. Disk 618 which is locally connected through I/O bus 615 is considered a true native volume, and its volume name "volume A" and icon appear in list 680. Likewise, volume B, which is the designation of networked volume 650, also appears in the list 680, indicating that the networked volume 650 can be written to/read from in the same manner as a native volume (such as local disk 618 (volume A)).

Figure 7:
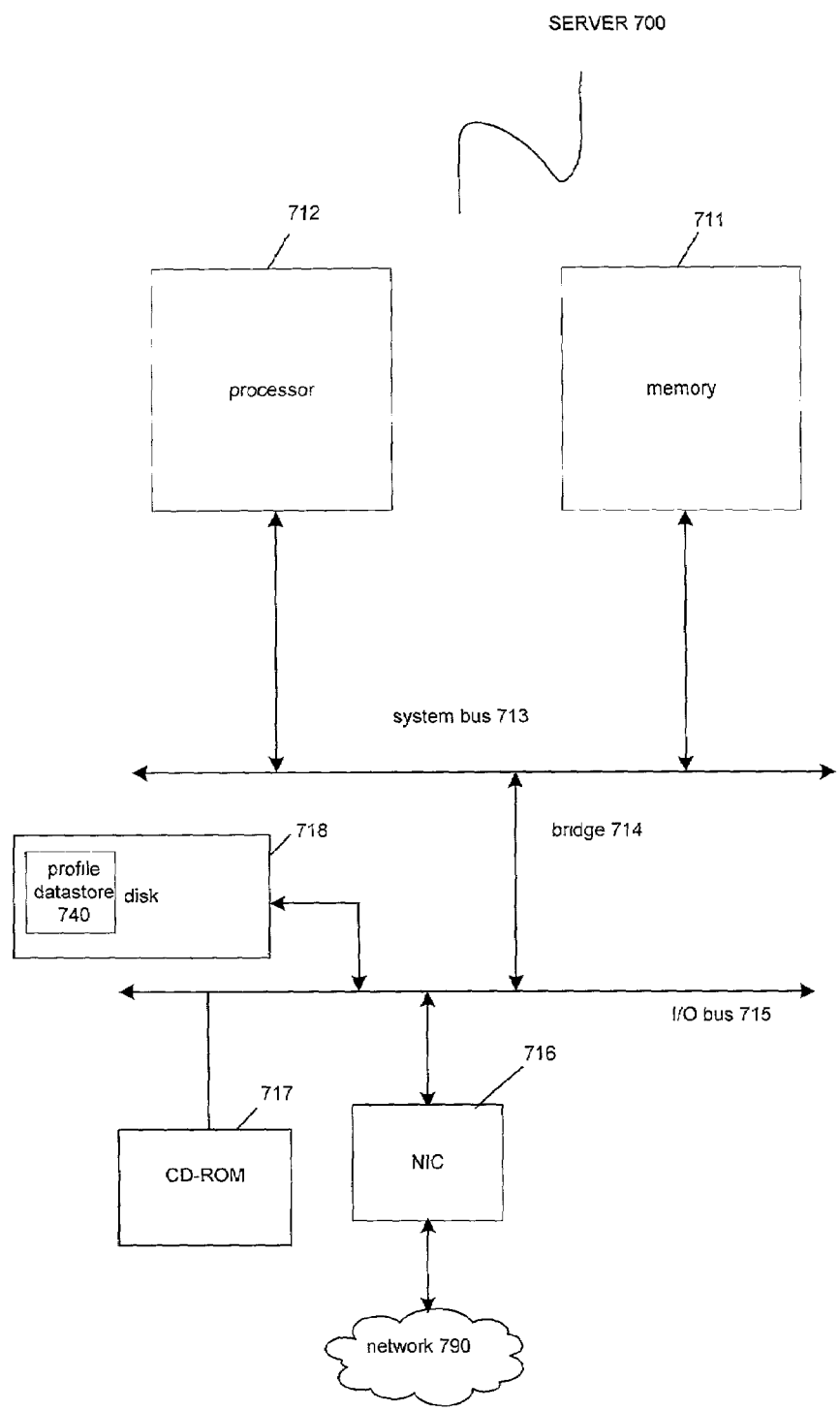
FIG. 7 shows an exemplary computer system when acting as a server in accordance with the present invention.

FIG. 7 shows an exemplary computer system acting as a server in accordance with the present invention. A server computer system 700 may be a desktop computer or any general or special purpose information processing device. The server system 700 features a system bus 713 for allowing components, such as a processor 712 and memory 711, to communicate with each other. Memory 711 consists of random access memory (RAM) or other volatile storage mechanism and operates to store instructions to be executed by processor 712 and data. Memory 711 also may be used for storing temporary variables or other intermediate result data during execution of instructions by processor 712.

Server system 700 also has a bridge 714 which couples to an I/O (Input/Output) bus 715. I/O bus 715 connects to system 700 various peripheral and I/O devices such as a network interface card (NIC) 716, a disk 718 and a CD-ROM (Compact Disc-Read Only Memory) 717. I/O bus 715 also couples to the system a display device 720 such as a monitor or LCD (Liquid Crystal Display). The NIC 716 enables the server 700 to connect to one or more networks 790 such as the Internet or a LAN (Local Area Network) and facilitates the exchange of information between server 700 and other clients/servers on that network 790. Disk 718 is a hard disk drive, floppy disk drive or tape drive and is used to store data/application files and other more permanent information.

In accordance with the invention, disk 718 would house a profile datastore 740 (containing volume mounting parameter records for login IDs and for generic events) as well as software to implement a web server. Using web server software, which can loaded into memory 711 and executed by processor 712, server 700 enables web pages and their components to be generated. For instance, when a client connects to the server website, the web server would generate a dialog requesting the client for a login ID and password. The web server would then authenticate the supplied login ID and password and return corresponding volume mounting parameters to the plug-in on the client. If the profile datastore 740 is a database or a part thereof, database server software may also be implemented in server 700 to process authentication and volume mounting parameter/profile retrievals. Server 700 is responsible for assembling the mounting command block which includes mounting parameters and a mount command. The server 700 also generates XML or other documents that may contain one or more mounting command blocks and transmit these to clients via the client plug-in. The server 700 also has a network address which is obtained by the plug-in on the client. If the address of server 700 is on the approved list contained within the plug-in, then the volumes designated in the volume mounting parameters of the mounting command block are mounted. Server 700 may be connected to one or more other servers such as a separate database server, or may incorporate a database server application as a process running within server 700.

I claim:

1. A method for automatically mounting a plurality of remote volumes to a client, comprising:
   without receiving a request from a user of said client to mount said plurality of remote volumes, logging into a first server;
   via a plug-in module installed on the client, receiving a set of mounting parameters from the first server; and
   at the client, automatically mounting said plurality of volumes utilizing said returned parameters, said volumes after mounting behaving as native to said client, even though said volumes are located remote to said client.

2. A method according to claim 1 wherein said logging includes:
   authenticating said client by said first server via an interface to said first server, said client authentication characterized by a login identification (ID).

3. A method according to claim 2 wherein said authenticating includes:
   supplying by the client said login ID and a password intended for said login ID.

4. A method according to claim 3 wherein said authenticating further includes:
   comparing said supplied password and said login ID with a stored password on said first server associated with said login ID; and
   if said stored password matches said supplied password for said login ID, then characterizing said client as successfully authenticated with said login ID.

5. A method according to claim 4 further comprising the first server generating said set of mounting parameters, said generating comprising:
   if successfully authenticated, retrieving said parameters from a profile datastore on said first server, said parameters indexed therein by said login ID; and
   assembling a mounting command block, said command block consisting of a mount command and said retrieved parameters.

6. A method according to claim 5 wherein said mounting command block is contained in an extensible markup language (XML) document.

7. A method according to claim 2 further comprising the first server generating said set of mounting parameters, said generating comprising:
   retrieving said parameters from a profile datastore on said first server, said parameters indexed therein by said login ID; and
   assembling a mounting command block, said command block consisting of a mount command and said retrieved parameters.

8. A method according to claim 7 wherein said mounting command block is contained in an extensible markup language (XML) document.

9. A method according to claim 1 that further includes:
   detecting the presence of a cookie on said client, said cookie indicating by its presence that said client has installed a plug-in module; and
   if said cookie is not detected, terminating any said volume mounting.

10. A method according to claim 1 wherein said logging is initiated by an event occurring on said client requiring said mounting.

11. A method according to claim 1 wherein automatically mounting includes:
    obtaining an address for said first server;
    comparing said address for said first server against a built-in list of approved servers; and
    if said address is not contained on said built-in list, then terminating the process of automatically mounting.

12. A method according to claim 11 further wherein if said address is contained on said built-in list, then:
    passing of said parameters by said plug-in to an application programming interface (API) of said client; and
    completing the mounting of said volume by said API, said mounting achieved absent of user intervention.

13. A method according to claim 1 wherein said remote interface is an Hypertext Transport Protocol capable browser.

14. A method according to claim 1 wherein said parameters include, for each of said volumes, a volume name, a server alias, a volume username, and a volume password.

15. A method according to claim 14 wherein said server alias is resolved to an address of a second server, said second server housing the volume identified by the corresponding said volume name.

16. A method according to claim 15 wherein said address of said second server is an Internet Protocol (IP) address.

17. A method according to claim 15 wherein said resolving is achieved by:
    looking up said server alias in a mapping table; and
    retrieving from said look up said address of said server from said mapping table.

18. A system for automatically mounting volumes over a network, said system comprising:
    a client configured to automatically request said mounting of said volumes without the need for a user of said client to request said mounting of said volumes;
    a server coupled to said client, said server configured to return a mounting command block to said client; and
    a plug-in installed in said client, said plug-in configured to approve the address of said server;
    said client utilizing said returned mounting command block to mount said volumes.

19. A system according to claim 18 further comprising:
    an application programming interface (API) coupled to said plug-in and configured to automatically mount said volumes specified in said mounting command block, without the need for user intervention.

20. In a computer system having a processor and memory, an apparatus for automatically mounting a plurality of remote volumes to said computer system, said apparatus comprising:

a plug-in module configured to receive from a server a mounting command block, said mounting command block comprising volume mounting parameters; and an application programming interface coupled to said plug-in module and configured to automatically mount said volumes specified in said mounting command block, said mounting performed without the need for user intervention.

\* \* \* \* \*